Patented Oct. 2, 1945

2,385,790

UNITED STATES PATENT OFFICE 2,385,790

PHENYL ENDOETHYLENE CYCLOPENTANOL

Herman A. Bruson, Philadelphia, Pa., assignor to The Resinous Products & Chemical Company, Philadelphia, Pa., a corporation of Delaware No Drawing. Application January 26, 1944, Serial No. 519,795

1 Claim. (Cl. 260—618)

This invention relates to a hydration-rearrangement product of 2,5-endomethylene-1,2,5,6-tetrahydro-diphenyl, said product being a secondary alcohol.

According to this invention, 2,5-endomethylene-1,2,5,6-tetrahydro-diphenyl (cf. Alder and Rickert, Ber. 71, 386 (1938)) is reacted with aqueous sulfuric acid of between 25% to 80% $H_2SO_4$ content at temperatures between about 65° and 130° C. so as simultaneously to hydrate the olefinic bond and to rearrange the endomethylene cycle, thereby forming a secondary alcohol having useful properties in industry.

This new alcohol is of value as an intermediate for the preparation of drugs, plasticizers, insecticides, and capillary-active materials. It may be converted by oxidation to the corresponding ketone, or it may be esterified with monocarboxylic acids or polycarboxylic acids to new esters useful in the plastics industry, particularly as plasticizers.

The reaction may be summarized as follows:

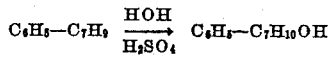

wherein the —$C_7H_9$ group represents a 2,5-endomethylene-1,2,5,6-tetrahydrophenyl group and —$C_7H_{10}$— represents an endoethylene cyclopentano group. The product may be named "phenyl endoethylene-cyclopentanol." Structurally, the product may be represented as:

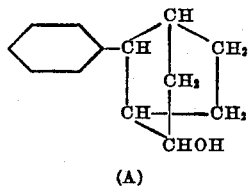

(A)

or

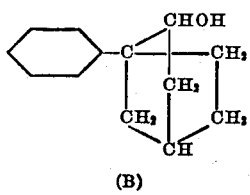

(B)

The difference between A and B lies in the relative position of the hydroxyl group to the phenyl group.

The following is a typical procedure for preparing this new alcohol, it being understood that the time, temperature, and concentrations can be considerably varied.

A mixture of 51 grams of 2,5-endomethylene-1,2,5,6-tetrahydro-diphenyl and 120 grams of aqueous 25%–30% sulfuric acid was rapidly stirred and boiled under reflux for four and one-half to six hours. The oil layer was separated, washed with dilute soda solution then with water, dried, and distilled in vacuo.

The desired secondary alcohol, phenyl endoethylene cyclopentanol, distilled over at 140°–145° C./2 mm. as a colorless oil.

The pure compound boils at 128°–130° C./1 mm.

In place of the 2,5-endomethylene-1,2,5,6-tetrahydrodiphenyl or phenyl 2,5-endomethylene-1,2,5,6-tetrahydrobenzene used in the above example, there may be used a diphenyl having a nuclear substituent in the phenyl ring. Useful substituents include halogens, such as chlorine and bromine, alkyl groups such as methyl or ethyl, aryl or aralkyl groups such as phenyl or benzyl, alkoxy groups such as methoxy, and similar groups commonly occurring in aromatic nuclei. The phenyl endomethylene tetrahydrobenzenes having substituents in the phenyl ring may be prepared from substituted styrene and cyclopentadiene. The hydration-rearrangement products are the comparable substituted phenyl endoethylene cyclopentanols, such as chlorophenyl endoethylene cyclopentanol. The alcohols have the general formula Ar—$C_7H_{10}OH$, wherein —$C_7H_{10}$— represents an endoethylene cyclopentano group and Ar is a phenyl nucleus.

I claim:

As a new compound, phenyl endoethylene cyclopentanol, a hydration-rearrangement product of 2,5-endomethylene-1,2,5,6-tetrahydrodiphenyl, said product being a secondary alcohol, boiling, when pure, at 128°–130° C. at 1 mm. pressure.

HERMAN A. BRUSON.